Sept. 30, 1969  K. KARL-AXEL ERIKSSON ET AL  3,470,450
CONVERTER WITH COMPENSATION FOR DC MAGNETIZATION
Filed July 27, 1966  3 Sheets-Sheet 1
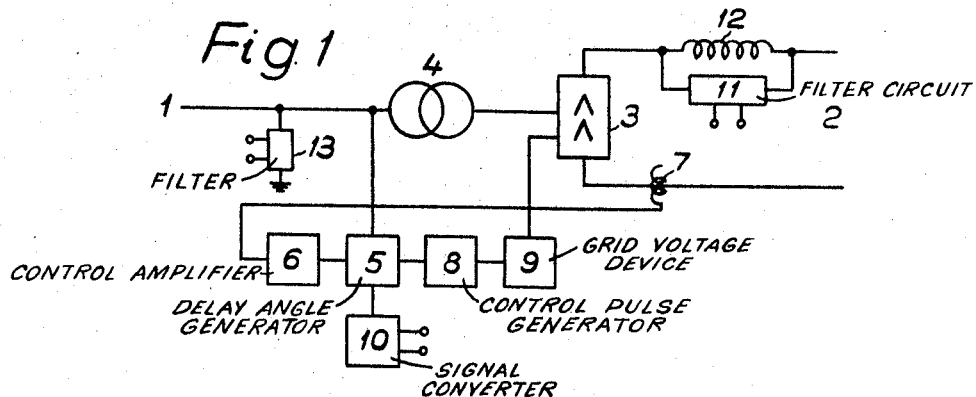
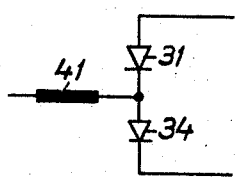
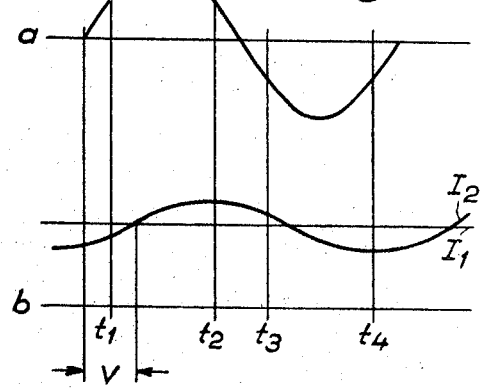
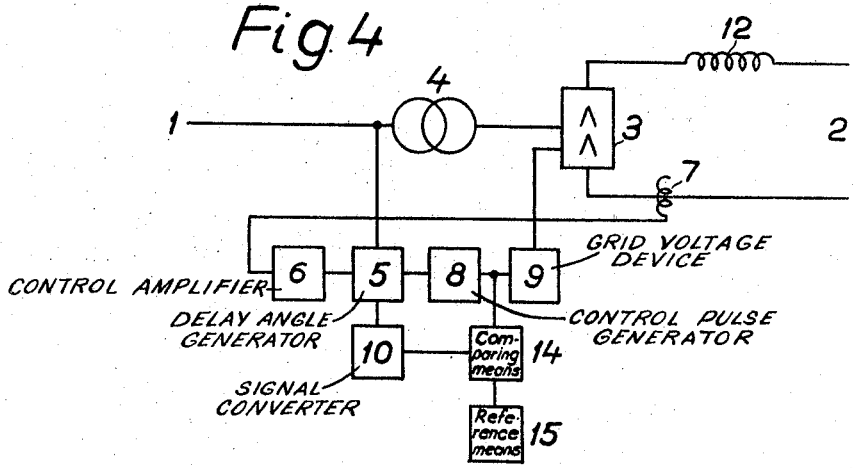
INVENTOR.
Kjell Karl-Axel Eriksson, Sven Erland Gustav Lindblad
Bengt Gösta Lindeberg
BY
Bailey, Stephens & Huettig
ATTORNEYS

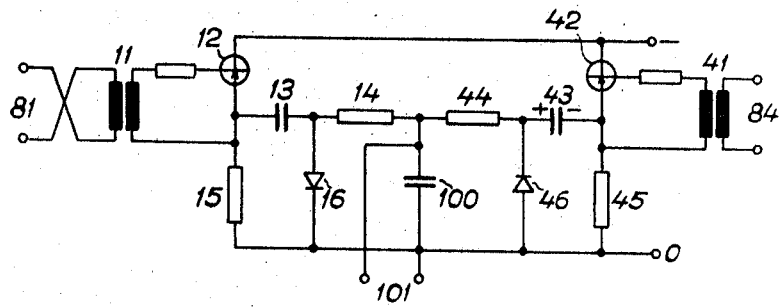
Fig. 5
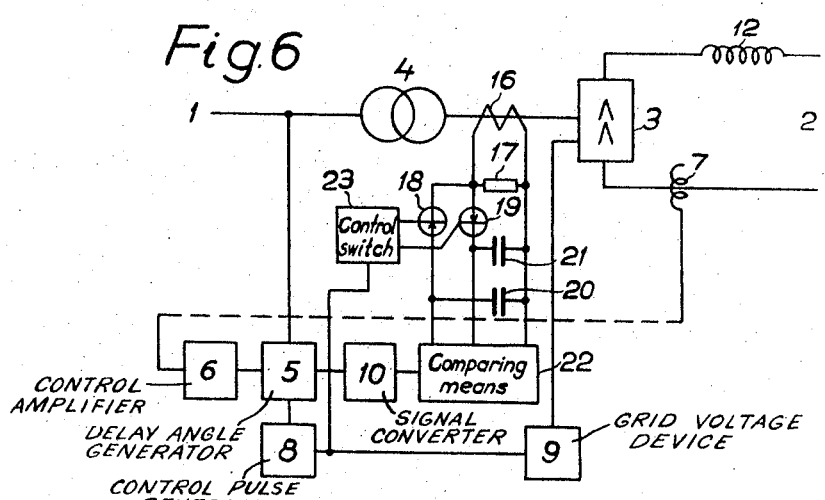
Fig. 6
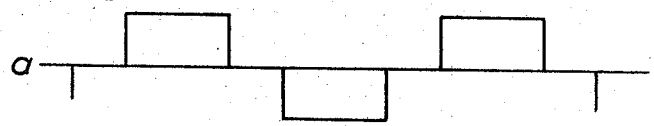
Fig. 7
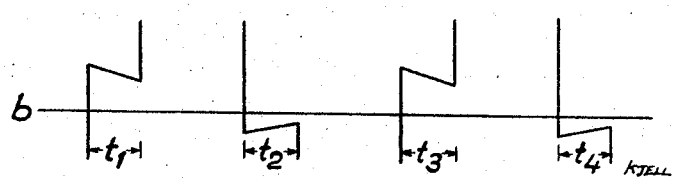

United States Patent Office 3,470,450
Patented Sept. 30, 1969

3,470,450
CONVERTER WITH COMPENSATION FOR DC MAGNETIZATION
Kjell Karl-Axel Eriksson and Sven Erland Gustav Lindblad, Ludvika, and Bengt Gösta Lindeberg, Orebro, Sweden, assignors to Allmanna Svenska Elektriska Aktiebolaget, Vasteras, Sweden, a Swedish corporation
Filed July 27, 1966, Ser. No. 568,166
Claims priority, application Sweden, July 28, 1965, 9,900/65
Int. Cl. H02m 1/08, 7/02
U.S. Cl. 321—16                              6 Claims

ABSTRACT OF THE DISCLOSURE

A static converter is provided with a rectifier bridge and a converter transformer and with circuitry for indicating directly or indirectly a DC magnetization in said converter transformer. Said indicating circuiting gives a signal for influencing a control system for the rectifier bridge in order to restore symmetric operation of the static converter and thus eliminate the DC magnetization of the converter transformer.

---

Figure 1A:
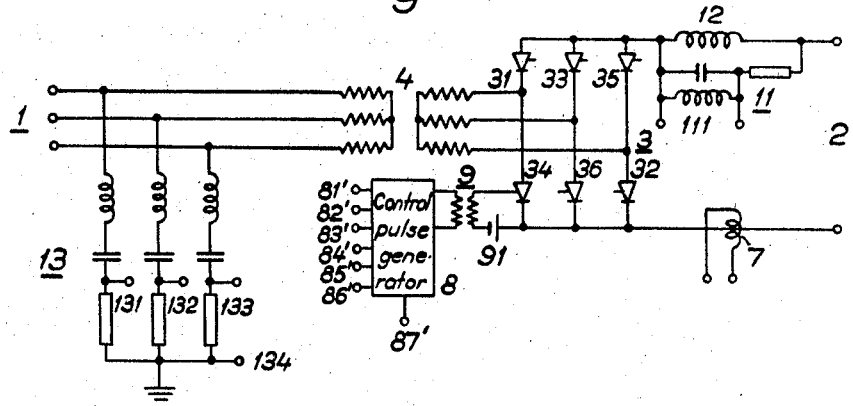

The present invention relates to a means in a static converter for avoiding DC magnetization of the converter transformer of the converter.

In converter transformers a DC magnetization sometimes occurs due, for example, to asymmetries in the delay angle control system of the rectifier connection or disturbances on the DC side coming from other converter groups. The phenomenon can be especially pronounced in transformers having high quality plate in the core and can there cause saturation of the core resulting in increased iron losses, increased power of the harmonics on the AC side of the converter and decreased stability in the whole converter.

According to the present invention it is proposed to prevent such a DC magnetization by intervening in the control of the rectifiers of the converter and a converter according to the invention will therefore be characterised by a means for deriving a magnitude representing a possible DC magnetization in the converter-transformer and the conversion of this magnitude into a signal which is supplied to the control system for the rectifiers of the converter. Intervention in the control must be carried out for each rectifier separately and may consist of an alteration in the length of the conducting intervals for the different rectifiers or an alteration of the phase position for such conducting intervals, whereby the average voltage during the conducting interval is altered. It is also clear that the polarity of said signal is decisive for its intervention in the rectifier control and for its connection to the various rectifiers. For example, in a two-way connection where two rectifiers having opposite conducting directions are connected to each phase of the converter transformer, a signal having a certain polarity will accelerate the ignition in one rectifier and delay the ignition in the other.

The magnitude representing the DC magnetization can be derived in different ways. As mentioned earlier, the DC magnetization may be due to asymmetries in the delay angle control of the rectifiers so that the conducting intervals for the different rectifiers are of different lengths. It is therefore possible by comparing the lengths of said conducting intervals to achieve a parameter for a DC magnetization and with the help of this parameter intervene in the delay angle control and in this way prevent said asymmetry in the control. Previously as another cause for a DC magnetization was mentioned disturbances on the DC side of the converter arising from disturbances in other converters. If a fault in a converter gives rise to a voltage oscillation on the DC side of the same frequency as the basic frequency of the AC side of the converter, this can cause the current intensity during the conducting intervals of the different rectifiers to be different, so that a DC magentization arises in spite of the fact that the length of the conducting intervals of the different rectifiers is equal. Thus, if a filter circuit is connected on the DC side of the converter, said filter circuit being tuned for the basic frequency of the AC side, an output voltage from said filter will indicate a reason for a DC magnetization. Both said reasons will give rise to asymmetries in the different phase currents on the rectifier side of the converter-transformer and therefore a third possibility to establish a DC magnetization is to analyse said phase currents. As previously mentioned, one of the results of a DC magnetization in the converter-transformer will be an increased power of the harmonics on the AC side of the converter, or more precisely harmonics of even numbers will arise on the network side of the converter-transformer. As indication for a DC magnetization, therefore, the output voltage from a filter connected to the network side of the converter transformer and tuned for one of the even harmonics of the AC side may be used.

Since it is not temporary variations in the magnetization of the converter-transformer, but a permanent tendency towards a DC magnetization which is to be prevented, the time constant for a compensating system according to the invention should preferably be chosen a tenth power greater than that in the existing control system for the converter so that preferably an accumulation of DC magnetization is compensated, and so that this compensation will not negatively influence the stability in the control system of the converter.

The invention will be described in more detail with reference to the accompanying drawings, where FIGURES 1, 1a, b and c show a principal sketch for one feature of a device according to the invention while FIGURE 2 shows a detail of this. FIGURE 3 shows voltage and current curves at DC over-tones while FIGURES 4–6 show different embodiments. FIGURE 7 shows curve forms for the phase current of the converter and the output signal from a device according to FIGURE 6.

FIGURE 1 shows a static converter for connecting an AC network 1 and a DC network 2. The converter comprises a rectifier connection, for instance a bridge connection 3 and a converter-transformer 4 and a control system for the rectifier connection which is usually composed of a so-called delay angle generator 5 which, in dependence on a reference voltage from the AC network 1 and a control magnitude from a control amplifier 6, emits control pulses, for example in the form of peak pulses to a control pulse generator 8. The control amplifier 6 may, for example, be controlled from the direct current in the network 2 by means of a measuring transductor 7 in this network. The control pulse generator 8 converts the signals coming from the delay angle generator into control pulses with suitable curve shape, for example rectangular curve shape, which through a grid voltage device 9 are supplied to the rectifiers in the rectifier connection 3.

To the delay angle generator 5 is also connected a member 10 forming a signal converter for a magnitude representing a possible DC magnetization in the converter transformer 4. This magnitude may be taken from either the result side or the cause side. One cause of a DC magnetization can, for example, be harmonics on the DC side having the same frequency as the base frequency on the AC side, in certain cases higher harmonics also, and for this reason a filter circuit 11 may be connected across a smoothing reactor 12 in the DC network 2. If the filter 11 is tuned for the base frequency of the AC side, an output voltage from this will indicate that a DC magnetization in the converter-transformer will take place, and for this reason such an output voltage can be used as input voltage for the member 10. Instead of a filter on the DC side a filter 13 on the AC side of the converter is also possible, tuned for one or several even harmonics in the AC network. An output voltage from the filter 13 will therefore indicate even harmonics on the AC side as a result of the converter-transformer being DC magnetized, and therefore this can also be used as input signal for the member 10.

In order to be able to utilize the signal from such a filter circuit, the member 10 must also contain a device for comparing the phase position of the harmonic in question with the phase position of the conducting intervals of the different rectifiers. In order to understand this, reference is made to FIGURES 2 and 3. In FIGURE 2 is shown a rectifier winding 41 in the converter-transformer 4 and the two rectifiers 31 and 34 connected to this winding. FIGURE 3a shows the phase voltage in the winding 41 while FIGURE 3b shows the direct current in the network 2. Under normal conditions, the direct current is constant, as indicated by the curve $I_1$. The intervals $t_1$–$t_2$ and $t_3$–$t_4$ indicate the conducting intervals for the rectifiers 31 and 34. With constant direct current the average current values during the shown conducting intervals will be equal and the phase current in the winding 41 will be a pure alternating current. If, however, for example, due to a fault in another converter, the direct current is superimposed by an alternating current having base frequency, the current curve shape will be as indicated by $I_2$ in FIGURE 3b. Thus, the average current during the conducting interval $t_1$–$t_2$ will be greater than during the interval $t_3$–$t_4$ and the phase current in the winding 41 will have a DC component.

In the shown case the phase displacement V between the phase voltage in FIGURE 3a and the overtone current in FIGURE 3b will be about 60°. If the phase displacement were 90° there would have been symmetry between the two half periods of the phase current and if the phase displacement were more than 90° the asymmetry would have been directed opposite to that in the shown case. It is clear that by lengthening or shortening the conducting intervals of the rectifiers 31 and 34 it is possible to attain balance in the phase current so that no DC component arises and it is further seen that the digressions from 90° of the phase displacement V produce the size and direction of the asymmetry and thus of the signal which is to correct the rectifier control.

In a similar manner an output voltage from the filter 13 can be utilized. The difference in the two cases is that the DC overtones from the filter 11 will be common for all AC phases, while from the filter 13 a voltage for each phase of the converter can be obtained.

The FIGURES 1a, b and c show FIGURE 1 in more detail. The reference numerals of FIGURE 1 are inserted in said figures.

In FIGURE 1a a three phase AC network 1 is connected to a DC network 2 by means of a static converter comprising a converter transformer 4 and a rectifier bridge 3 comprising six rectifiers 31–36 symbolically shown as thyristors, but other kinds of rectifiers, for instance, mercury arc rectifiers, could be used.

For the rectifier 34 the control system is shown in more detail comprising a control voltage transformer 9 connected to the control electrode of the rectifier in series with a bias voltage source 91. The control voltage transformer 9 is fed from a control pulse generator 8 having an output for each of the rectifiers 31–36 but only the output for the rectifier 34 connected through the transformer 9 is shown.

Said control pulse generator 8 is suitably made as a multiphase electronic two-stable switch connection transferring a multiphase peak voltage from the delay angle generator 5 into a multiphase control voltage with rectangular curve shape and with a pulse length corresponding to the desired conducting intervals for the different rectifiers 31–36 respectively. More precisely, the different phases of the generator 8 can be made as bi-stable switch connections of on-off type. The input circuit of the generator 8 is suitably Y-connected with phase terminals 81'–86' and a neutral terminal 87'.

Figure 1B:
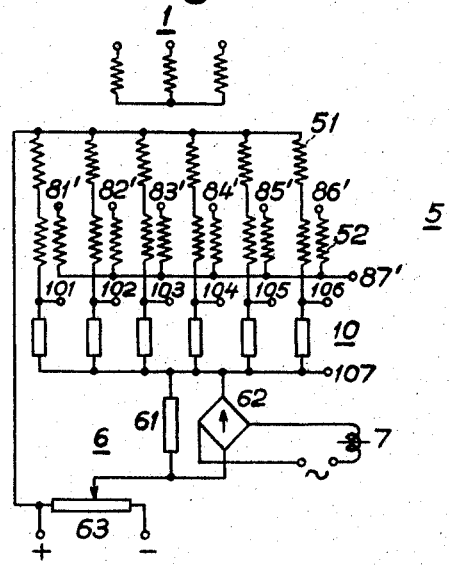
Figure 1C:
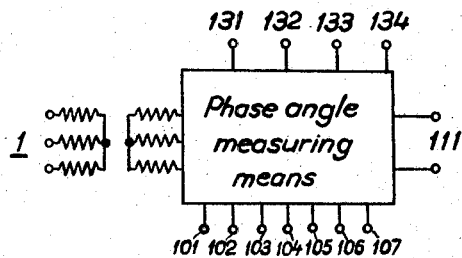

The delay angle generator 5 is shown in FIGURE 1b and comprises a voltage transformer connected to the network 1 in FIGURE 1a. Said voltage transformer connected to the network 1 in FIGURE 1a. Said voltage transformer has a six-phase secondary winding 51 connected in series with the primary windings of a six-phase peak-voltage transformer 52 with saturatable cores and in series with the control amplifier 6.

Said control amplifier comprises a potentiometer 63 by means of which a certain voltage corresponding to a certain desired direct current in the network 2 is positioned. The real direct current is measured by means of the transductor 7 shown in FIGURES 1a and b and by means of the rectifier bridge 62 this current is represented by the voltage over the resistor 61 counteracting the voltage from the potentiometer 63. As a matter of fact the sum voltage over the resistor 61 and the potentiometer 63 is connected through an amplifier not shown.

When the sum voltage level from the potentiometer 63 and resistor 61 is passed by the phase voltages from the winding 51, peak voltages are induced in the corresponding secondary phase windings of the transformer 52, which peak voltages are connected to terminals 81'–87' in the control pulse generator 8 thus switching over the different phases of said generator. By adjusting the potentiometer 63 thus, the phase position of the peak voltages and thereby also the control pulses are adjusted.

In order to obtain a further control, namely the control according to the invention, resistors 10 are inserted in series with the phases of the delay angle generator 5. Said resistors are provided with terminals 101–106 and a common terminal 107. Said terminals are fed with voltages from a phase angle measuring means of known type indicated in FIGURE 1c.

Said phase angle measuring means is provided with three sets of input terminals and a set of output terminals 101–107 corresponding to the same terminals in FIGURE 1b.

The first set of input terminals is connected to the network 1 in FIGURE 1a through a voltage transformer.

The second set of terminals 111 is connected to a band block filter 11 in FIGURE 1a tuned to the base frequency of the AC network 1 in FIGURE 1a. Said filter is connected in series with a resistor and in parallel with the smoothing reactor 12 in said figure.

Thus, if a harmonic occurs in the DC network 2 with the base frequency of the AC network an AC voltage occurs over the terminals 111 and the phase position of this voltage is compared with the phase voltages from the network 1 in such a way that a phase angle of 90° between the two voltages will give zero output while a phase angle different from 90° will give an output voltage on the corresponding one of the terminals 101–106. Said output voltages are connected to the corresponding resistors 10 in FIGURE 1b and will thus influence the phase position of the corresponding peak voltages on the terminals 81'–86' so that the desired phase displacement of the corresponding control pulses from the generator 8 is obtained.

The third set of terminals 131–134 of the phase angle measuring means is connected to terminals of the same numbers in FIGURE 1a on resistors connected in series with a band pass filter 13 tuned for an even harmonic of the AC network 1. Thus if such a harmonic occurs in said AC network, this will give voltages over said resistors and thus on the terminals 131–134 on the phase angle measuring means, which voltages are compared with the normal phase voltages from the AC network. In this way a signal is obtained on the terminals 101–107, thus influencing the delay angle generator 5 in FIGURE 1b.

It should be pointed out that normally the converter is only provided with one of the filters 11 or 13 and the corresponding input terminals of the phase angle measuring means as it is normally sufficient to detect the harmonics on one side of the converter.

A more direct indication of a DC magnetization is obtained according to the construction shown in FIGURE 4, where, by means of a member 14 the length of the control pulses from the control pulse generator 8 is measured, and thus the length of the conducting intervals of the different rectifiers. With a two-way connection it is suitable to compare the length of the conducting intervals for the two rectifiers connected to each phase, for example the rectifiers shown in FIGURE 2, so that in each phase a measurement is obtained which in size and polarity indicates a possible asymmetry and thus the DC component in the phase current in question. Instead of comparing the conducting intervals in pairs, each conducting interval may be compared with a reference magnitude from a reference means 15. In both cases a polarized signal is obtained which is supplied to the member 10 which transmits to the delay angle generator 5 signals to make the rectifiers operate symmetrically. Time measuring of the conducting intervals may be done by directly integrating the control pulses thus obtaining a direct voltage magnitude or the control pulses may be used to control a second voltage and integrate this voltage as indicated in FIGURE 5. Further, it can be mentioned that with a three-phase converter having a two-way, six-pulse connected rectifier bridge, it is sufficient to arrange a symmetry device for the rectifiers in two of the phases. If, therefore, symmetry is secured within two phases, the third phase will automatically be symmetrical.

FIGURE 5 shows how the member 14 in FIGURE 4 can be formed as a sort of switch connection for one phase of the converter and controlled by the control pulse generator 8, for example by means of the control pulses belonging to the rectifiers 31 and 34 in FIGURE 2. Said control pulses are connected to the primary sides 81 and 84 of the transformers 11 and 41 respectively, with opposite polarity so that the control pulse to the transformer 11 makes the transistor 12 conducting, while the control pulse to the transformer 41 blocks the transistor 42.

During a period of a phase voltage in FIGURE 3a, therefore, the switch connection in FIGURE 5 will operate in four stages.

During the first stage, corresponding to the conducting interval of the rectifier 31, i.e. approximately 120° both the transistors 12 and 42 will be conducting.

During the next stage of about 60° when both the rectifiers 31 and 34 are blocked the transistor 12 will be blocked and the transistor 42 conducting.

During the next 120°, corresponding to the conducting interval of therectifier 34, both the transistors will be blocked.

During the last stage of 60° when both the rectifiers 31 and 34 are again blocked, the transistor 12 will still be blocked while the transistor 42 is conducting, i.e. as in the second stage.

The connection also contains two large resistors 14 and 44 and two smaller resistors 15 and 45, together with two capacitors 13 and 43 and two anti-parallel-connected diodes 16 and 46. The whole connection is inserted between zero potential and a negative voltage connected to upper part. Said capacitors 13 and 43 are chosen so great that they have a large time constant in relation to the conducting intervals of the rectifiers, whereby they could simply be taken as constant voltage sources. The voltage over the capacitor 43 will therefore be substantially equal to the voltage across the whole connection with positive polarity on the left side, while the voltage over the capacitor 13 will be negligible.

During the first of the above mentioned stages, the charging current flows to the capacitor 43 through the diode 46 and the voltage across this diode will therefore be almost zero. However, the voltage across the whole connection will block the diode 16 and the capacitor 100 will be charged with negative polarity on its upper side.

During the next stage the transistor 12 is blocked, the voltage across the two diodes 16 and 46 will be zero and the capacitor 100 will retain the voltage stored in it.

During the third stage both the transistors 12 and 42 are blocked and the voltage in the capacitor 43 moves over to the diode 46 and recharges the capacitor 100 with positive polarity on its upper side.

During the fourth stage the voltage across both the diodes is again zero and the capacitor 100 retains its voltage.

Thus during a period of the corresponding phase voltage the capacitor 100 will be charged with alternatively positive and negative voltage on its upper side. Since both the capacitor and the resistors 14 and 44 are large the time constant for said capacitor will be large and thus there will arise across the terminals 101 a pure alternating voltage having relatively little amplitude as long as the control pulses for the corresponding rectifiers in the converter are equally long. If, however, these control pulses are of different lengths, which would mean a DC magnetization of the converter-transformer, the capacitor 100 will be charged with a voltage of constant positive or neagtive polarity which, via the member 10 in FIGURES 4 and 1b, will give a signal to the delay angle generator 5, whereby an adjustment of the control pulses is obtained.

In this way the symmetry of the converter is ensured with a single connection having few components.

In the connection described in FIGURES 4 and 5 a DC magnetization is indicated owing to differences in the length of the conducting intervals for the rectifiers. If, however, the DC magnetization depends on different conducting intervals a DC magnetization can occur even if the device according to FIGURES 4 and 5 shows complete control symmetry in the rectifier connection. A more safe indication for DC magnetization is obtained, however, by analysing the currents in the phase conductors between the converter-transformer 4 and the rectifier connection 3. For such an analysis current transformers 16 may be connected in the phase conductors as indicated in FIGURE 6. Such current transformers will form a model of the converter-transformer since a DC magnetization in the converter-transformer will also cause a DC magnetization in these current transformers.

The phase currents occuring between the converter-transformer and the rectifier bridge 3 consist of positive and negative current pulses 120° in length separated by currentless intervals 60° in length as indicated in FIGURE 7a. At complete symmetry the secondary voltage from the converter-transformer 16 will have approximately the same appearance. At asymmetry, however, with a DC magnetization of the converter-transformer and current transformers as a result, voltages will be induced on the secondary sides of the current transformers during the currentless intervals on the primary side. According to the invention it is therefore proposed to utilize said secondary voltages as a measurement for a DC magnetization of the transformers, whereby the secondary voltages of the current transformers are disconnected during the conducting intervals of the corresponding rectifiers and only measured during the currentless intervals of the phase conductors. In this way at DC magnetization of the current transformers these secondary voltages will have, for example, the appearance shown in FIGURE 7b showing positive and negative voltage pulses corresponding to the current-less intervals $t_1$, $t_2$, $t_3$ and $t_4$ in FIG. 7a while no voltage arises in FIG. 7b during the conducting intervals of the rectifiers.

The performance of the connection is seen from FIG. 6 where a resistor 17 is connected to the secondary side of the current transformer 16. Across this resistor are connected two reverse-parallel-connected transistors 18 and 19 in series with corresponding capacitors 20 and 21. The transistors 18 and 19 are controlled by a control device 23 connected to the control pulse generator 8 and so formed that the transistors belonging to one phase of the transformer are only conducting when the output voltage from the corresponding phase of the control pulse generator is zero. In this way a voltage will arise across one of the capacitors 20 and 21 corresponding to the time integral of the voltages occurring during the odd intervals $t_1$, $t_3$, etc., while the voltage across the other capacitor corresponds to the time integral of the voltages during the even intervals $t_2$, $t_4$, etc.

These voltage integrals are supplied to a comparison member 22 from which is derived a signal of one or the other polarity which, via the member 10, is supplied to the delay angle generator 5.

Due to the magnetization in the current transformers, even at complete symmetry low voltages will be induced during the intervals $t_1$–$t_4$. These voltages, however, are equally great during the odd and even intervals, so that the voltages across the capacitors 20 and 21 will also be equal and the output signal from the comparison member 22 will be zero.

If, on the other hand, the primary voltages in the current transformers 16 are asymmetrical the secondary voltages during said odd and even intervals will be different and therefore a positive or negative signal is obtained from the member 22, which signal causes, via the member 10, an adjustment in the delay angle generator 5.

Since the magnetization conditions in the current transformers 16 exactly correspond to those in the converter-transformer 4, the output signal from 22 will be correct whether a possible DC magnetization is due to asymmetry in the delay angle generator 5 or possibly the members 8 or 9 or whether it is due to the base frequency component on the DC side 2. The character of the voltages shown in FIGURE 7b will of course be different in the two cases mentioned, but the member 22 will in any case emit a signal until the time integrals of the positive and negative current pulses shown in FIGURE 3a become equal.

If the asymmetry in the phase current is due to control pulses of different lengths as described in connection with FIGURES 4 and 5, it is possible by adjusting the delay angle generator 5 to attain complete symmetry in the phase currents. If, however, the asymmetry is due to a DC overtone according to FIGURE 3, it is impossible to attain complete symmetry and the two current intervals of the phase current must then have different lengths and different amplitudes. For this reason the voltages across the capacitors 20 and 21 will not be equal until adjustment of the delay angle generator 5 has gone so far that the phase current becomes asymmetrical in the opposite direction, which thus involves an overcompensation.

This situation means that there is a fault in principle in the device which cannot be eliminated. However, the fault can by means of suitable choice of components and suitable dimensioning of the device, be made as small as desired and if the resulting DC magnetization in the converter-transformer 4 thus becomes considerably less than the neutral magnetization of the transformer, the consequences of the DC magnetization will be negligible.

We claim:

1. Static converter connecting an AC network and a DC network; said static converter comprising a converter transformer and a rectifier bridge having a plurality of rectifiers therein connected to said transformer; control means for the rectifiers of said rectifier bridge; means for measuring a magnitude indicating a DC magnetization in said converter transformer; the output side of said measuring means being connected to said control means for said rectifiers; said measuring means comprising time measuring means operatively connected to the rectifiers for measuring the length of the conducting periods of the different rectifiers of said rectifier bridge; comparing means for comparing the length of said conducting periods with a reference magnitude; corresponding to a certain desired length of said conducting intervals, the difference between the length of said conducting periods and said reference magnitude forming the output signal of said measuring means, said difference being the magnitude indicating a DC magnetization.

2. Static converter as claimed in claim 1; said comparing means including means for comparing two at a time of the lengths of the conducting intervals of the different rectifiers; said lengths of said conducting intervals of said different rectifiers forming reference magnitudes with respect to each other.

3. Static converter connecting an AC network and a DC network; said static converter comprising a converter transformer and a rectifier bridge having a plurality of rectifiers therein connected to said transformer; control means for the rectifiers of said rectifier bridge; means for measuring a magnitude indicating a DC magnetization in said converter transformer; the output side of said measuring means being connected to said control means for said rectifiers; phase conductors between said rectifier bridge and said converter transformer; said measuring means comprising current transformers in said phase conductors; comparing means connected to the secondary side of said current transformer; for comparing the two half periods of the output voltage from said current transformer; said comparing means forming an output circuit for said measuring means, said output circuit connecting said measuring means to said control means.

4. Static converter as claimed in claim 3; switching means inserted between said current transformers and said comparing means; said switching means being controlled from said control means for said rectifiers; said switching means during the conducting intervals of said rectifiers and to cause them to be conducting during the blocking intervals of said rectifiers.

5. Static converter connecting an AC network and a DC network; said static converter comprising a converter transformer and a rectifier bridge having a plurality of rectifiers therein connected to said transformer; control means for the rectifiers of said rectifier bridge; means for measuring a magnitude indicating a DC magnetization in said converter transformer; the output side of said measuring means being connected to said control means for said rectifiers; said measuring means comprising filter means on the DC side of said static converter; said filter means comprising a band pass filter tuned for the basic frequency of said AC network; phase angle measuring means for measuring the phase angle between an output voltage from said filter means and the voltage of said AC network; said phase angle measuring means forming an output circuit for the whole measuring means.

6. Static converter connecting an AC network and a DC network; said static converter comprising a converter transformer and a rectifier bridge having a plurality of rectifiers therein connected to said transformer; control means for the rectifiers of said rectifier bridge; means for measuring a magnitude indicating a DC magnetization in said converter transformer; the output side of said measuring means being connected to said control means for said rectifiers; said measuring means comprising filter means on the AC side of said static converter; said filter means comprising a band pass filter tuned for an even harmonic of said AC network; phase angle measuring means for measuring the phase angle between an output voltage from said filter means and the voltage of said AC network; said phase angle measuring means forming an output circuit for the whole measuring means.

References Cited
UNITED STATES PATENTS

| | | | |
|---|---|---|---|
| 3,329,883 | 7/1967 | Frierdich | 321—47 XR |
| 3,343,063 | 9/1967 | Keeney et al. | 321—5 |
| 3,344,326 | 9/1967 | Risberg | 321—5 XR |
| 3,351,838 | 11/1967 | Hunter | 321—5 |
| 3,356,930 | 12/1967 | Lupoli et al. | 321—16 XR |

LEE T. HIX, Primary Examiner

W. M. SHOOP, Jr., Assistant Examiner

U.S. Cl. X.R.

321—18